United States Patent
Minami et al.

(10) Patent No.: US 9,890,279 B2
(45) Date of Patent: Feb. 13, 2018

(54) ALIPHATIC POLYESTER RESIN COMPOSITION AND ALIPHATIC POLYESTER RESIN MOLDED ARTICLE

(71) Applicant: KANEKA CORPORATION, Osaka-shi (JP)

(72) Inventors: Tetsuya Minami, Settsu (JP); Noriyuki Suzuki, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/107,687

(22) PCT Filed: Dec. 4, 2014

(86) PCT No.: PCT/JP2014/006073
§ 371 (c)(1),
(2) Date: Jun. 23, 2016

(87) PCT Pub. No.: WO2015/098001
PCT Pub. Date: Jul. 2, 2015

(65) Prior Publication Data
US 2016/0326364 A1    Nov. 10, 2016

(30) Foreign Application Priority Data
Dec. 24, 2013  (JP) ................ 2013-265179

(51) Int. Cl.
C08L 67/04    (2006.01)
(52) U.S. Cl.
CPC ......... *C08L 67/04* (2013.01); *C08L 2201/06* (2013.01); *C08L 2205/06* (2013.01); *C08L 2205/24* (2013.01)

(58) Field of Classification Search
CPC ...................................... C08L 67/04
USPC .................................... 521/40
See application file for complete search history.

(56) References Cited

U.S. PATENT DOCUMENTS

| 2008/0071018 A1 | 3/2008 | Smillie et al. |
| 2014/0272370 A1* | 9/2014 | Broyles ......... C08L 23/06 428/220 |

FOREIGN PATENT DOCUMENTS

| EP | 2 907 850 A1 | 8/2015 |
| JP | 2007-077232 A | 3/2007 |
| WO | WO 2008/099586 A1 | 8/2008 |
| WO | WO 2009/087971 A1 | 7/2009 |

OTHER PUBLICATIONS

International Search Report dated Feb. 3, 2015, in PCT/JP2014/006073 (filed Dec. 4, 2014) with English Translation of Written Opinion.
Extended European Search Report dated Jun. 9, 2017, in European Patent Application No. 14874462.6.

* cited by examiner

Primary Examiner — Terressa Boykin
(74) Attorney, Agent, or Firm — Oblon, McClelland, Maier & Neustadt, L.L.P.

(57) ABSTRACT

An object is to improve slow crystallization that is a drawback of polyhydroxyalkanoates, improve processability in mold processing, such as injection molding, improve processing speed, and suppress blooming from a obtaining molded article. Provided is an aliphatic polyester resin composition including a polyhydroxyalkanoate (A), a vinyl acetate-containing copolymer (B), and pentaerythritol (C), wherein the polyhydroxyalkanoate (A) and the vinyl acetate-containing copolymer (B) are immiscible.

20 Claims, 1 Drawing Sheet

ALIPHATIC POLYESTER RESIN COMPOSITION AND ALIPHATIC POLYESTER RESIN MOLDED ARTICLE

TECHNICAL FIELD

The present invention relates to an aliphatic polyester resin composition, and particularly relates to an aliphatic polyester resin composition intended to allow a biodegradable polyester resin, which is decomposed by the action of microorganisms, to be applied to various industrial materials, and a molded article containing such an aliphatic polyester resin composition.

BACKGROUND ART

In recent years, biodegradable plastics have been actively developed as materials that can solve problems caused by the large burden of plastic waste on the global environment, such as harmful effects on the ecosystem, generation of harmful gas during combustion, and global warming due to a large amount of heat generated by combustion.

Particularly, carbon dioxide generated by combustion of plant-derived biodegradable plastics was originally present in the air. Therefore, combustion of plant-derived biodegradable plastics does not increase the amount of carbon dioxide in the atmosphere. This is referred to as "carbon neutral", and is regarded as important under The Kyoto Protocol that sets targets for reducing carbon dioxide emissions. Therefore, active use of plant-derived biodegradable plastics is desired.

Recently, from the viewpoint of biodegradability and carbon neutral, aliphatic polyester-based resins have received attention as plant-derived plastics. Particularly, polyhydroxyalkanoate (hereinafter, sometimes referred to as PHA)-based resins have received attention. Among PHA-based resins, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins (hereinafter, sometimes referred to as P3HB4HB), polylactic acid, etc. have received attention.

However, the above-described PHA-based resins are slow in crystallization, and therefore require a long cooling time for solidification after heat-melting in mold processing, which causes problems such as poor productivity and temporal change in mechanical properties (especially, toughness such as tensile elongation at break) due to secondary crystallization that occurs after molding.

Therefore, blending of a PHA-based resin with an inorganic material such as boron nitride, titanium oxide, talc, lamellar silicate, calcium carbonate, sodium chloride, or metal phosphate has heretofore been proposed to improve crystallization. However, the blending with an inorganic material has many adverse effects on a obtaining molded article, such as reduction in tensile elongation and poor surface appearance, and is therefore poorly effective.

As other attempts to improve crystallization of the PHA-based resins, there are exemplified a method of adding a sugar alcohol compound derived from natural products, such as erythritol, galactitol, mannitol, and arabitol (Patent Literature 1), a method of adding a polyvinyl alcohol, chitin, or chitosan (Patent Literature 2), and the like. However, crystal nucleating agents having a substantially high effect have not yet been found at present.

CITATION LIST

Patent Literature

PTL 1: WO 2008/099586
PTL2: JP 2007-077232 A

SUMMARY OF INVENTION

Technical Problem

The present inventors have found that the crystallization rate of the PHA-based resin can be significantly improved by mixing pentaerythritol as a crystal nucleating agent with the PHA-based resin. Furthermore, with respect to organic compound-based crystal nucleating agents including pentaerythritol, it has been also found by the present inventors that a phenomenon as the so-called blooming may occur, i.e., the crystal nucleating agent comes out on the surface of the molded article at the time of using the molded article depending on processing conditions and combination of materials.

It is an object of the present invention to improve slow crystallization that is a drawback of biodegradable polyesters, especially polyhydroxyalkanoate (PHA)-based resins, which are decomposed into water and carbon dioxide by the action of microorganisms, so that processability in mold processing, such as injection molding, is improved, processing speed is increased, and blooming from a obtaining molded article is suppressed.

Solution to Problem

The present inventors have found that both improvement in processability as well as suppression of blooming from a molded article can be achieved by blending a polyhydroxyalkanoate which is slow in crystallization with a vinyl acetate-containing copolymer and pentaerythritol so that the polyhydroxyalkanoate and the vinyl acetate-containing copolymer are immiscible, which has led to the completion of the present invention.

That is, the present invention is directed to an aliphatic polyester resin composition comprising a polyhydroxyalkanoate (A), a vinyl acetate-containing copolymer (B), and pentaerythritol (C), wherein the polyhydroxyalkanoate (A) and the vinyl acetate-containing copolymer (B) are immiscible.

It is preferable that the aliphatic polyester resin composition comprises 0.5 to 5 parts by weight of the vinyl acetate-containing copolymer (B) and 0.05 to 20 parts by weight of the pentaerythritol (C) with respect to 100 parts by weight of the polyhydroxyalkanoate (A).

It is preferable that the vinyl acetate-containing copolymer (B) is an ethylene-vinyl acetate copolymer.

It is preferable that the vinyl acetate-containing copolymer (B) is an ethylene-vinyl acetate copolymer having a vinyl acetate content of 30 to 60 wt %.

It is preferable that the vinyl acetate-containing copolymer (B) is an ethylene-vinyl acetate-carbon monoxide terpolymer.

It is preferable that the vinyl acetate-containing copolymer (B) has a vinyl acetate content of 20 to 40 wt % and a carbon monoxide content of 5 to 20 wt %.

It is preferable that the polyhydroxyalkanoate (A) contains a repeating unit represented by the following general formula (1):

(wherein R is an alkyl group represented by $C_nH_{2n+1}$ and n is an integer of 1 or more and 15 or less).

It is preferable that the polyhydroxyalkanoate (A) is one or more selected from poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

The present invention is also directed to an aliphatic polyester resin molded article obtained by molding the aliphatic polyester resin composition.

Advantageous Effects of Invention

The resin composition according to the present invention can improve slow crystallization that is a drawback of PHA-based resins, improve processability in mold processing, such as injection molding, improve processing speed, and suppress blooming from a obtaining molded article.

DESCRIPTION OF EMBODIMENTS

Figure 1:
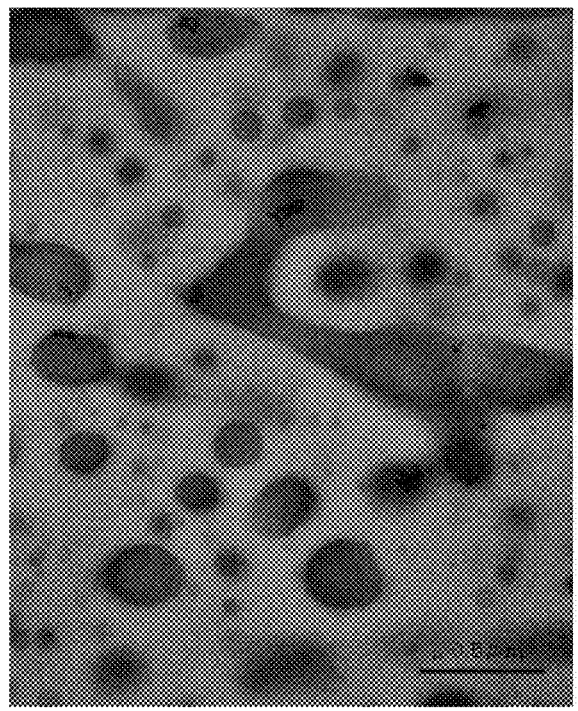
FIG. 1 is a transmission electron micrograph used to determine miscibility between a polyhydroxyalkanoate (PHA) and a vinyl acetate-containing copolymer resin, in which the PHA and the vinyl acetate-containing copolymer are regarded as being in an "immiscible" state where the PHA forms a continuous phase and the vinyl acetate-containing copolymer forms a dispersion phase.

Hereinbelow, the present invention will be described in more detail.

An aliphatic polyester resin composition according to the present invention contains a PHA (A), a vinyl acetate-containing copolymer (B) and pentaerythritol (C), wherein the PHA (A) and the vinyl acetate-containing copolymer (B) are immiscible.

[Polyhydroxyalkanoate (A)]

In the present invention, the PHA (A) is an aliphatic polyester resin containing a repeating unit represented by the general formula: [—CHR—$CH_2$—CO—O—].

The PHA (A) used in the present invention is preferably an aliphatic polyester containing a repeating unit represented by the formula (1): [—CHR—$CH_2$—CO—O—] (wherein R is an alkyl group represented by $C_nH_{2n+1}$ and n is an integer of 1 or more and 15 or less).

The PHA is preferably a polymer resin containing 80 mol % or more of 3-hydroxybutyrate, more preferably a polymer resin containing 85 mol % or more of 3-hydroxybutyrate. The PHA is preferably produced by a microorganism. Specific examples of the PHA include a poly(3-hydroxybutyrate) homopolymer resin, a poly(3-hydroxybutyrate-co-3-hydroxypropionate) copolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, a poly(3-hydroxybutyrate-co-3-hydroxyheptanoate) copolymer resin, a poly(3-hydroxybutyrate-co-3-hydroxyoctanoate) copolymer resin, a poly(3-hydroxybutyrate-co-3-hydroxynonanoate) copolymer resin, a poly(3-hydroxybutyrate-co-3-hydroxydecanoate) copolymer resin, a poly(3-hydroxybutyrate-co-3-hydroxyundecanoate) copolymer resin, and a poly(3-hydroxybutyrate-co-4-hydroxybutyrate) copolymer resin.

Particularly, from the viewpoint of mold processability and the physical properties of a molded article, a poly(3-hydroxybutyrate) homopolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, or a poly(3-hydroxybutyrate-co-4-hydroxybutyrate) copolymer resin is suitable for use as the PHA.

These PHAs may be used alone or in combination of two or more thereof.

From the viewpoint of mold processability and the quality of a molded article, the content ratio of 3-hydroxybutyrate (hereinafter, sometimes referred to as 3HB) to a comonomer copolymerized therewith, such as 3-hydroxyvalerate (hereinafter, sometimes referred to as 3HV), 3-hydroxyhexanoate (hereinafter, sometimes referred to as 3HH), or 4-hydroxybutyrate (hereinafter, sometimes referred to as 4HB), in the PHA, that is, the ratio of monomers in a copolymer resin as the PHA, is preferably 3-hydroxybutyrate/comonomer=97/3 to 80/20 (mol %/mol %), more preferably 95/5 to 85/15 (mol %/mol %). If the comonomer content is less than 3 mol %, there is a case where a mold processing temperature and a pyrolysis temperature are close to each other, and therefore mold processing is difficult. If the comonomer content exceeds 20 mol %, there is a case where the PHA is slowly crystallized, and therefore productivity is poor.

Each monomer content in a copolymer resin as the PHA can be measured by gas chromatography in the following manner. About 20 mg of the dry PHA is mixed with 2 mL of a sulfuric acid/methanol mixed liquid (15/85 (weight ratio)) and 2 mL of chloroform in a vessel, and the vessel is tightly sealed. Then, the mixture is heated at 100° C. for 140 minutes to obtain a methyl ester of PHA degradation product. After cooling, 1.5 g of sodium hydrogen carbonate is added thereto little by little for neutralization, and the obtaining mixture is allowed to stand until generation of carbon dioxide gas is stopped. The mixture is well mixed with 4 mL of diisopropyl ether, and then the monomer unit composition of the PHA degradation product in a supernatant is analyzed by capillary gas chromatography to determine each monomer content in the copolymer resin.

The gas chromatography is performed using "GC-17A" manufactured by SHIMADZU CORPORATION as a gas chromatograph and "NEUTRA BOND-1" (column length: 25 m, column inner diameter: 0.25 mm, liquid film thickness: 0.4 μm) manufactured by GL Sciences Inc. as a capillary column. He gas is used as a carrier gas, a column inlet pressure is set to 100 kPa, and a sample is injected in an amount of 1 μL. As for temperature conditions, the temperature is increased from an initial temperature of 100° C. to 200° C. at a rate of 8° C./min, and is further increased from 200 to 290° C. at a rate of 30° C./min.

In the present invention, the weight-average molecular weight of the PHA is preferably 200000 to 2500000, more preferably 250000 to 2000000, even more preferably 300000 to 1000000. If the weight-average molecular weight is less than 200000, there is a case where, for example, mechanical properties are poor. If the weight-average molecular weight exceeds 2500000, there is a case where mold processing is difficult.

The weight-average molecular weight can be measured using a gel permeation chromatograph ("Shodex GPC-101" manufactured by Showa Denko K.K.), a polystyrene gel column ("Shodex K-804" manufactured by Showa Denko K.K.), and chloroform as a mobile phase, and can be determined as a molecular weight based on a polystyrene calibration curve. In this case, the calibration curve is prepared using polystyrene standards having weight-average molecular weights of 31400, 197000, 668000, and 1920000.

It is to be noted that the PHA is produced by a microorganism such as *Alcaligenes eutrophus* AC32 strain produced by introducing a PHA synthetic enzyme gene derived from *Aeromonas caviae* into *Alcaligenes eutrophus* (International Deposit under Budapest Treaty, International Depository Authority: International Patent Organism Depositary, National Institute of Advanced Science and Technology (6 Chuo, 1-1-1, Higashi, Tsukuba, Ibaraki, Japan), Date of Original Deposit: Aug. 12, 1996, transferred on Aug. 7, 1997, Deposit Number: FERM BP-6038 (transferred from original deposit FERM P-15786)) (J. Bacteriol., 179, 4821 (1997)).

[Vinyl Acetate-Containing Copolymer (B)]

The vinyl acetate-containing copolymer (B) used in the present invention comprises vinyl acetate as a structural unit, and is not particularly limited as long as the PHA (A) and the vinyl acetate-containing copolymer (B) are immiscible, but those containing ethylene and vinyl acetate as a structural unit are preferred.

Examples of the vinyl acetate-containing copolymer (B) include an ethylene-vinyl acetate copolymer (hereinafter, sometimes referred to as EVA) and an ethylene-vinyl acetate-carbon monoxide terpolymer (hereinafter, sometimes referred to as EVACO).

(Ethylene-Vinyl Acetate Copolymer)

The ethylene-vinyl acetate copolymer resin (B) preferably has a vinyl acetate content (hereinafter, referred to as VA content) of 30 to 60 wt %, more preferably 35 to 60 wt %. If the VA content is less than 30 wt %, there is a case where the surface of the molded article is peeled off. If the VA content exceeds 60 wt %, there is a case where the PHA and the EVA are fully miscible, so that the blooming from the molded article may not be suppressed. It is to be noted that the VA content of the EVA can be determined in accordance with JIS K 7192.

Specific examples of the EVA include "Levapren 600HV" (EVA with a VA content of 60 wt %) manufactured by LANXESS, "Levapren 500HV" (EVA with a VA content of 50 wt %) manufactured by LANXESS, "Levapren 450" (EVA with a VA content of 45 wt %) manufactured by LANXESS, "Levapren 400" (EVA with a VA content of 40 wt %) manufactured by LANXESS, "Levapren 500XL" (partially-crosslinked EVA with a VA content of 50 wt %) manufactured by LANXESS; "EVAFLEX EV45LX" (EVA with a VA content of 46 wt %) manufactured by DuPont-Mitsui Polychemicals Co., Ltd., "EVAFLEX EV40LX" (EVA with a VA content of 41 wt %) manufactured by DuPont-Mitsui Polychemicals Co., Ltd., "EVAFLEX EV150" (EVA with a VA content of 33 wt %) manufactured by DuPont-Mitsui Polychemicals Co., Ltd., "EVAFLEX V523" (EVA with a VA content of 33 wt %) manufactured by DuPont-Mitsui Polychemicals Co., Ltd.; "Ultrathene 760" (EVA with a VA content of 42 wt %) manufactured by Tosoh Corporation, "Ultrathene 750" (EVA with a VA content of 32 wt %) manufactured by Tosoh Corporation; and "Evatate R5011" (EVA with a VA content of 41 wt %) manufactured by Sumitomo Chemical Co., Ltd., "Evatate M5011" (EVA with a VA content of 32 wt %) manufactured by Sumitomo Chemical Co., Ltd. At least one of them can be used.

(Ethylene-Vinyl Acetate-Carbon Monoxide Terpolymer)

The ethylene-vinyl acetate-carbon monoxide terpolymer preferably has a VA content of 20 to 40 wt % and a carbon monoxide content of 5 to 20 wt %. If the VA content is less than 20 wt %, the surface of the molded article may be peeled off. If the VA content is more than 40 wt %, the PHA and the EVACO are fully miscible, so that blooming of pentaerythritol may not be suppressed.

Further, if the CO content of the ethylene-vinyl acetate-carbon monoxide terpolymer is less than 5 wt %, the surface of the molded article may be peeled off due to its poor affinity with the PHA. If the CO content is more than 20 wt %, the PHA and the EVACO are fully miscible, so that blooming from the molded article may not be suppressed.

Specific examples of the EVACO include "ELVALOY 741" (EVACO with a VA content of 24 wt % and a CO content of 10 wt %) manufactured by Du Pont-Mitsui Polychemicals Co., Ltd., and "ELVALOY 742" (EVACO with a VA content of 28.5 wt % and a CO content of 9 wt %) manufactured by Du Pont-Mitsui Polychemicals Co., Ltd. At least one of them can be used.

The content of the vinyl acetate-containing copolymer (B) for use in the present invention is not particularly limited as long as the PHA (A) and the vinyl acetate-containing copolymer (B) are immiscible, but the content is preferably 0.5 to 5 parts by weight, more preferably 0.7 to 3 parts by weight with respect to 100 parts by weight of the PHA (A). If the content is less than 0.5 parts by weight, blooming from the molded article may not be suppressed, and if the content exceeds 5 parts by weight, the effect of pentaerythritol as a crystal nucleating agent may be deteriorated.

In the present invention, the miscibility between the PHA and the vinyl acetate-containing copolymer is determined in the following manner. The aliphatic polyester resin composition or the aliphatic polyester resin molded article is stained with $RuO_4$ and observed with a transmission electron microscope ("H-7650" manufactured by Hitachi, Ltd.) at a magnification of 10000 to 40000. When the PHA and the vinyl acetate-containing copolymer are dispersed to the extent that they cannot be discriminated from each other, this state is regarded as "miscible", and when a dispersion structure is formed in which the PHA forms a continuous phase and the vinyl acetate-containing copolymer forms a dispersion phase, this state is regarded as "immiscible".

[Pentaerythritol (C)]

The aliphatic polyester resin composition according to the present invention uses pentaerythritol (C) as a crystal nucleating agent for the polyhydroxyalkanoate.

Pentaerythritol is a compound represented by the following formula (2).

[Chemical Formula 1]

(2)

Pentaerythritol is one of polyhydric alcohols and is an organic compound in a white crystal form with a melting point of 260.5° C. Pentaerythritol is classified as a sugar alcohol, but is not derived from a natural product and can be synthesized by condensation of acetaldehyde and formaldehyde in a basic condition.

The pentaerythritol used in the present invention is not particularly limited as long as it is usually commonly available, and may be a reagent or an industrial product. Examples of the reagent include, but are not limited to, those manufactured by Wako Pure Chemical Industries, Ltd., Sigma-Aldrich, Tokyo Chemical Industry Co., Ltd., and Merck Ltd. Examples of the industrial product include, but are not limited to, those manufactured by KOEI CHEMICAL CO., LTD. (trade name: Pentarit), The Nippon Synthetic Chemical Industry Co., Ltd. (trade name: Neulizer P), and TOYO CHEMICALS CO., LTD.

Some of such commonly-available reagents and industrial products contain, as an impurity, an oligomer produced by dehydration condensation of pentaerythritol, such as dipentaerythritol or tripentaerythritol. The oligomer does not have the effect of crystallizing the polyhydroxyalkanoate (A), but does not inhibit the crystallization effect of the pentaerythritol. Therefore, the oligomer may be contained.

The amount of the pentaerythritol used in the present invention is not particularly limited as long as the crystallization of the polyhydroxyalkanoate (A) can be improved. However, in order to obtain the effect of the pentaerythritol as a crystal nucleating agent, the lower limit of the amount of the pentaerythritol contained is preferably 0.05 parts by weight, more preferably 0.1 parts by weight, even more preferably 0.5 parts by weight with respect to 100 parts by weight of the polyhydroxyalkanoate (A) contained. If the amount of the pentaerythritol is too large, there is a case where the viscosity of the aliphatic polyester resin composition during melt processing is reduced, and it is therefore difficult to process the aliphatic polyester resin composition. Therefore, the upper limit of the amount of the pentaerythritol contained is preferably 20 parts by weight, more preferably 10 parts by weight, even more preferably 8 parts by weight with respect to 100 parts by weight of the polyhydroxyalkanoate (A) contained.

[Aliphatic Polyester Resin Composition]

The aliphatic polyester resin composition according to the present invention is superior to a polyhydroxyalkanoate itself or a resin composition containing a polyhydroxyalkanoate and a sugar alcohol compound other than the pentaerythritol in that crystallization of the resin composition stably progresses during processing under a wide range of processing conditions, and therefore has the following advantages.

In the case of poly(3-hydroxybutyrate-co-3-hydroxyhexanoate (P3HB3HH) or poly(3-hydroxybutyrate-co-3-hydroxyvalerate (P3HB3HV) as an example of the polyhydroxyalkanoate, the progress of its crystallization induced by cooling after heat-melting is influenced by a resin temperature during melting. That is, the crystallization is less likely to progress when a resin temperature during melting is higher. For example, in the case of P3HB3HH, when a resin temperature during melting is in the range of the melting point of the resin to about 170° C., the crystallization of the resin during cooling is less likely to progress when the resin temperature during melting is higher.

Further, when the resin temperature during melting is about 180° C. or higher, the crystallization of the resin during cooling tends to progress over several hours. Therefore, in order to successfully perform mold processing, the resin temperature during melting needs to be controlled to be in the range of about 170° C. to 180° C. However, in commonly-performed mold processing, the resin temperature during melting is not uniform, and therefore it is very difficult to control the resin temperature during melting to be in the above range.

The crystallization of the aliphatic polyester resin composition according to the present invention stably progresses even when a resin temperature during melting is in a wide range. That is, the crystallization of the resin composition quickly progresses with stability even when a resin temperature during melting is in the range of the melting point of the resin to about 190° C., and therefore the resin composition according to the present invention has excellent processing characteristics under a wide range of processing conditions. It is to be noted that from the viewpoint of thermal degradation, it is not preferred that melt processing is performed when the resin temperature during melting is 200° C. or higher.

Further, the progress of crystallization of the polyhydroxyalkanoate depends also on a cooling temperature. For example, in the case of P3HB3HH, its crystallization tends to most progress when a cooling temperature after heat-melting is 50 to 70° C., and its crystallization is less likely to progress when the cooling temperature is lower than 50° C. or higher than 70° C. In commonly-performed mold processing, a mold temperature correlates to the cooling temperature, and therefore needs to be controlled to be in the above temperature range of 50° C. to 70° C. However, in order to uniformly control the mold temperature, the structure or shape of a mold needs to be tightly designed, which is very difficult.

The crystallization of the aliphatic polyester resin composition according to the present invention stably progresses even when the cooling temperature of the resin after melting is in a wide range. That is, the crystallization of the resin composition quickly progresses with stability even when a cooling temperature after heat-melting is in the range of 20° C. to 80° C., and therefore the resin composition according to the present invention has excellent processing characteristics under a wide range of processing conditions.

The aliphatic polyester resin composition according to the present invention has the above advantages that cannot be obtained by any conventional polyhydroxyalkanoate resin or any resin composition containing a polyhydroxyalkanoate resin and a sugar alcohol compound other than the pentaerythritol, which makes it possible to set a resin temperature during melting or a cooling temperature, such as a mold temperature, over a wide range. Therefore, the aliphatic polyester resin composition has excellent processing characteristics.

The aliphatic polyester resin composition according to the present invention is quickly crystallized with stability, and therefore expresses the following characteristics.

For example, in the case of P3HB3HH, its crystallization does not sufficiently progress during molding, and therefore gradually progresses even after molding so that spherulites grow. This tends to gradually embrittle a molded article due to a temporal change in mechanical properties. On the other hand, in the case of the aliphatic polyester resin composition according to the present invention, a plurality of microcrystals are formed just after molding, and therefore spherulites are less likely to grow after molding. This suppresses embrittlement of a molded article. Therefore, the polyester resin composition is excellent in the quality stability of its product.

Further, there is a gap at a joint between cavities of a mold for injection molding (e.g., parting line portion, insertion portion, slide core sliding portion), and therefore "flash" formed by injecting a molten resin into the gap during injection molding is attached to a molded article. The polyhydroxyalkanoate is slowly crystallized and has flowability for a long time. Therefore, flash is easily formed, and post-processing of a molded article requires much effort. However, the aliphatic polyester resin composition according to the present invention is quickly crystallized, which makes it difficult to form flash. Therefore, effort required for post-processing of a molded article can be reduced, which is preferred from a practical point of view.

The aliphatic polyester resin composition according to the present invention can be more easily produced by a known melt-kneading machine as long as the machine can heat to a temperature equal to or higher than the melting point of the polyhydroxyalkanoate and can knead components contained in the aliphatic polyester resin composition. For example, the polyhydroxyalkanoate, the vinyl acetate-containing copolymer, the pentaerythritol, and if necessary, another component may be melt-kneaded by an extruder, a roll mill, a Banbury mixer, or the like to form pellets, and then the pellets may be used to molding. Alternatively, a previously-prepared masterbatch containing a high concentration of the pentaerythritol may be blended with the polyhydroxyalkanoate and the vinyl acetate-containing copolymer in a desired ratio, and the resulting mixture may be melt-kneaded and subjected to molding. The pentaerythritol, the polyhydroxyalkanoate, and the vinyl acetate-containing copolymer may be added to a kneading machine at the same time. Alternatively, the pentaerythritol may be added after the polyhydroxyalkanoate and the vinyl acetate-containing copolymer resin are melted in advance.

The aliphatic polyester resin composition according to the present invention can be easily obtained by melt-kneading the PHA and the vinyl acetate-containing copolymer (B) at a temperature equal to or higher than the melting point of the PHA or by blending the PHA and the vinyl acetate-containing copolymer (B) in a solvent, such as chloroform, that can dissolve both the resins. However, from the viewpoint of productivity, the aliphatic polyester resin composition is preferably produced by melt-kneading.

The aliphatic polyester resin composition according to the present invention may contain various additives as long as the effects of the present invention are not impaired. Examples of the additives include lubricants, crystal nucleating agents other than the pentaerythritol, plasticizers, hydrolysis inhibitors, antioxidants, releasing agents, ultraviolet absorbers, coloring agents such as dyes and pigments, inorganic fillers, and organic fillers. These additives are usable in accordance with the purpose of the resin composition. These additives preferably have biodegradability.

Other examples of the additives include inorganic fibers such as carbon fibers, and organic fibers such as human hair and wool. Alternatively, natural fibers may be used, such as bamboo fibers, pulp fibers, kenaf fibers, analogous other plant alternatives, annual herbaceous plants of the genus Hibiscus, family Malvaceae, and annual herbaceous plants of the family Tiliaceae. From the viewpoint of carbon dioxide reduction, plant-derived natural fibers are preferred, and kenaf fibers are particularly preferred.

[Aliphatic Polyester Resin Molded Article]

The following is an example of a method for producing a molded article containing the aliphatic polyester resin composition according to the present invention.

First, the PHA, the vinyl acetate-containing copolymer (B), the pentaerythritol, and if necessary, the above-described various additives are melt-kneaded using an extruder, a kneader, a Banbury mixer, rolls, or the like to prepare an aliphatic polyester resin composition. Then, the aliphatic polyester resin composition is extruded into a strand, and the strand is cut to obtain aliphatic polyester resin composition pellets having a particle shape such as a column shape, an elliptic column shape, a spherical shape, a cubic shape, or a rectangular parallelepiped shape.

In the above-described melt-kneading, the temperature at which the PHA, the vinyl acetate-containing copolymer (B), etc. are melt-kneaded depends on the melting point, melt viscosity, etc. of the PHA used or the melt viscosity etc. of the vinyl acetate-containing copolymer (B), so that the temperature cannot generally be defined. However, the resin temperature of a melt-kneaded product at a die outlet is preferably 140 to 200° C., more preferably 150 to 195° C., even more preferably 160 to 190° C. If the resin temperature of a melt-kneaded product is less than 140° C., there is a case where the dispersed state of the vinyl acetate-containing copolymer (B) in the PHA is deteriorated. If the resin temperature of a melt-kneaded product exceeds 200° C., there is a case where the PHA is thermally decomposed.

The pellets prepared by the above method are sufficiently dried at 40 to 80° C. to remove moisture. Then, the pellets can be mold-processed by a known mold processing method to obtain any molded article. Examples of the mold processing method include film forming, sheet forming, injection molding, blow molding, fiber spinning, extrusion foaming, and bead foaming.

Examples of a method for producing a film formed article include T-die extrusion forming, calendar forming, roll forming, and blown film forming. However, the film forming method is not limited thereto. The temperature at which film forming is performed is preferably 140 to 190° C. Further, a film obtained from the aliphatic polyester resin composition according to the present invention can be subjected to thermoforming, vacuum forming, or press forming.

Examples of a method for producing an injection-molded article include injection molding methods such as an injection molding method commonly used to mold a thermoplastic resin, a gas assist molding method, and an injection compression molding method. According to the intended use, any injection molding method other than the above methods may be also used, such as an in-mold molding method, a gas press molding method, a two-color molding method, a sandwich molding method, the PUSH-PULL method, or the SCORIM method. However, the injection molding methods are not limited thereto. The temperature at which injection molding is performed is preferably 140 to 190° C., and the temperature of a mold is preferably 20 to 80° C., more preferably 30 to 70° C.

The molded article according to the present invention is suitable for use in the fields of agriculture, fishery, forestry, gardening, medicine, sanitary items, food industry, clothing, non-clothing, packaging, automobiles, building materials, etc.

EXAMPLES

Hereinafter, the present invention will be specifically described with reference to examples, but the technical scope of the present invention is not limited by these examples.

Polyhydroxyalkanoate A1: Polyhydroxyalkanoate obtained in Production Example 1 was used.

Production Example 1

The culture production of PHA was performed using KNK-005 strain (see U.S. Pat. No. 7,384,766).

The composition of a seed medium was: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ (pH 6.8).

The composition of a preculture medium was: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$). Palm oil was added at a time as a carbon source at a concentration of 10 g/L.

The composition of a PHA production medium was: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$), and 0.05 w/v % BIOSPUREX 200K (defoaming agent: manufactured by Cognis Japan Ltd.).

First, a glycerol stock (50 μL) of KNK-005 strain was inoculated into the seed medium (10 mL) and seed-cultured for 24 hours. Then, the resulting seed culture was inoculated at 1.0 v/v % into a 3-liter jar fermenter (MDL-300 manufactured by B. E. MARUBISHI Co., Ltd.) containing 1.8 L of the preculture medium. Preculture was performed for 28 hours under operation conditions where a culture temperature was 33° C., a stirring speed was 500 rpm, and a ventilation volume was 1.8 L/min while pH was controlled to be in the range of 6.7 to 6.8. The pH control was performed using a 14% aqueous ammonium hydroxide solution.

Then, the resulting preculture was inoculated at 1.0 v/v % into a 10-liter jar fermenter (MDS-1000 manufactured by B. E. MARUBISHI Co., Ltd.) containing 6 L of the production medium. Culture was performed under operation conditions where a culture temperature was 28° C., a stirring speed was 400 rpm, and a ventilation volume was 6.0 L/min while pH was controlled to be in the range of 6.7 to 6.8. The pH control was performed using a 14% aqueous ammonium hydroxide solution. Palm oil was used as a carbon source. The culture was performed for 64 hours. After the completion of the culture, cells were collected by centrifugal separation, washed with methanol, and lyophilized to measure the weight of the dried cells.

One-hundred milliliters of chloroform was added to 1 g of the obtained dried cells, and the resulting mixture was stirred at room temperature all day and night to extract PHA from the cells. The mixture was filtered to remove cell debris, and the resulting filtrate was concentrated by an evaporator until its total volume became 30 mL. Then, 90 ml of hexane was gradually added to the filtrate, and the resulting mixture was allowed to stand for 1 hour while being gently stirred. The mixture was filtered to separate the deposited PHA, and the PHA was vacuum-dried at 50° C. for 3 hours. The 3l-1H content of the obtained PHA was measured by gas chromatography in the following manner. Twenty milligrams of the dried PHA was mixed with 2 mL of a sulfuric acid-methanol mixed liquid (15:85) and 2 mL of chloroform in a vessel, and the vessel was tightly sealed. Then, the resulting mixture was heated at 100° C. for 140 minutes to obtain a methyl ester of PHA degradation product. After cooling, 1.5 g of sodium hydrogen carbonate was added thereto little by little for neutralization, and the resulting mixture was allowed to stand until generation of carbon dioxide gas was stopped. The mixture was well mixed with 4 mL of diisopropyl ether and then centrifuged. Then, the monomer unit composition of the aliphatic polyester degradation product in a supernatant was analyzed by capillary gas chromatography. The gas chromatography was performed using GC-17A manufactured by SHIMADZU CORPORATION as a gas chromatograph and NEUTRA BOND-1 (column length: 25 m, column inner diameter: 0.25 mm, liquid film thickness: 0.4 μm) manufactured by GL Sciences Inc. as a capillary column. He gas was used as a carrier gas, a column inlet pressure was set to 100 kPa, and a sample was injected in an amount of 1 μL. As for temperature conditions, the temperature was increased from an initial temperature of 100 to 200° C. at a rate of 8° C./min, and was further increased from 200 to 290° C. at a rate of 30° C./min. As a result of the analysis performed under the above conditions, the PHA was found to be poly(3-hydroxybutyrate-co-3-hydroxyhexanoate (P3HB3HH) represented by the chemical formula (1). The 3-hydroxybutyralte (3HB) content was 94.4 mol % and the 3-hydroxyhexanoate (3HH) content was 5.6 mol %.

After the completion of the culture, P3HB3HH was obtained from the culture solution by the method described in WO 2010/067543. The P3HB3HH had a weight-average molecular weight of 600000 as measured by GPC.

Polyhydroxyalkanoate A2: Polyhydroxyalkanoate obtained in Production Example 2 was used.

Production Example 2

A polyhydroxyalkanoate as a raw material A2, P3HB3HH, was obtained in the same manner as in Production Example 1 except that KNK-631 strain was used and palm kernel oil was used as a carbon source. The P3HB3HH had a weight-average molecular weight of 650000, a 3HB content of 88.6 mol %, and a 3HH content of 11.4 mol %.

Polyhydroxyalkanoate A3: Polyhydroxyalkanoate obtained in Production Example 3 was used.

Production Example 3

Using C. necator H16 strain (ATCC17699) as a production strain, P3HB having a weight-average molecular weight of 850000 was prepared in accordance with the method described in WO 09/145164.

Polyhydroxyalkanoate A4: EM5400F (poly(3-hydroxybutyrate-co-4-hydroxybutyrate, P3HB4HB) manufactured by Ecomann and having a 3HB content of 86 mol %, a 4HB content of 14 mol %, and a weight-average molecular weight of 1050000) was used.

Other materials used in examples and comparative examples are shown below.

Vinyl acetate-containing copolymers B1 to B5: the following products were used.

B1: "EVAFLEX EV150" (EVA with a VA content of 33 wt %) manufactured by DuPont-Mitsui PolyChemical Co., Ltd.

B2: "Levapren 500HV" (EVA with a VA content of 50 wt %) manufactured by LANXESS

B3: "Levapren 800HV" (EVA with a VA content of 80 wt %) manufactured by LANXESS

B4: "ELVALOY 741" (EVACO with a VA content of 24 wt % and a CO content of 10 wt %) manufactured by Du Pont-Mitsui Polychemicals Co., Ltd.

B5: "ELVALOY 742" (EVACO with a VA content of 28.5 wt % and a CO content of 9 wt %) manufactured by Du Pont-Mitsui Polychemicals Co., Ltd.

Example 1

(Production of Aliphatic Polyester Resin Composition)

Polyhydroxyalkanoate A1, vinyl acetate-containing copolymer B1, and pentaerythritol (Pentarit T manufactured by Koei Chemical Co., Ltd.) were blended in a blending ratio shown in Table 1 (blending ratios shown in the following tables are expressed in part(s) by weight) and melt-kneaded using an co-rotating intermeshing twin screw extruder (TEM-26SS manufactured by TOSHIBA MACHINE CO., LTD.) at a preset temperature of 120 to 160° C. (outlet resin temperature of 170° C.) and a screw rotation speed of 100 rpm to obtain an aliphatic polyester resin composition. The temperature of the molten resin discharged from a die was directly measured with a K-type thermocouple and defined as a resin temperature. The aliphatic polyester resin composition was extruded through the die into a strand, and the strand was cut to obtain pellets.

(Miscibility Between Polyhydroxyalkanoate and Vinyl Acetate-Containing Copolymer)

Figure 2:
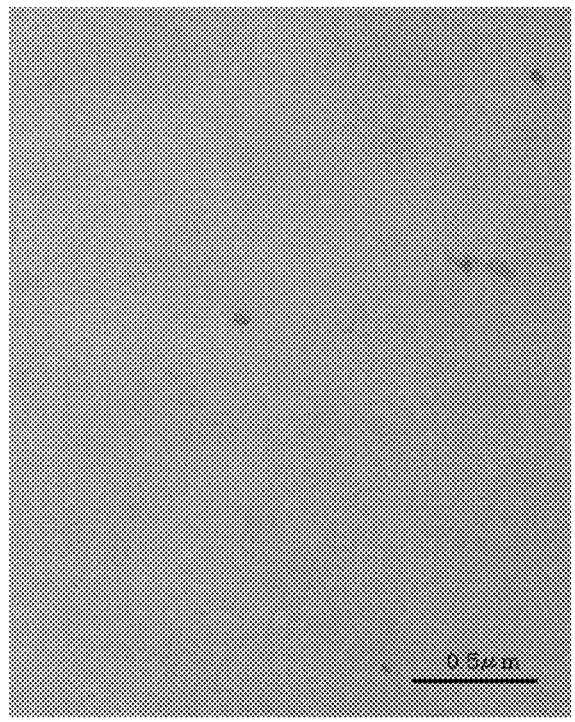
FIG. 2 is a transmission electron micrograph used to determine miscibility between a polyhydroxyalkanoate (PHA) and a vinyl acetate-containing copolymer resin, in which the PHA and the vinyl acetate-containing copolymer are regarded as being in a "miscible" state where they cannot be discriminated from each other.

The aliphatic polyester resin composition or the aliphatic polyester resin molded article was stored at 23° C. under atmosphere of 50% humidity for one month, stained with $RuO_4$, and observed with a transmission electron microscope ("H-7650" manufactured by Hitachi, Ltd.) at a magnification of 10000 to 40000. When a dispersion structure was formed in which the PHA formed a continuous phase and the vinyl acetate-containing copolymer formed a dispersion phase (observed as large black lumps), this state was regarded as "immiscible" (FIG. 1), and when the PHA and the vinyl acetate-containing copolymer were dispersed to the extent that they could not be discriminated from each other (large black lumps were not observed at all), this state was regarded as "miscible" (FIG. 2).

(Injection Molding)

The obtained aliphatic polyester resin composition as a raw material was molded into flat plate molded articles with 120 mm in length, 120 mm in width, and 2 mm in thickness, using an injection molding machine (IS-75E manufactured by TOSHIBA MACHINE CO LTD.) under conditions where the cylinder preset temperature of the molding machine was 120 to 150° C. (outlet resin temperature of 168° C.) and the preset temperature of a mold was 55° C.

(Release Time)

The processability of the aliphatic polyester resin composition according to the present invention was evaluated in terms of release time during injection molding. In the injection molding, the release time is defined as the time required for a resin injected into a mold to cure so that an obtaining specimen can be released from the mold without distortion when the mold is opened and the specimen is ejected by an ejector pin. A shorter release time means that crystallization is faster and mold processability is better or has been improved.

(Blooming Evaluation)

A flat plate molded article obtained from an aliphatic polyester resin composition by an injection molding was stored at 23° C. under atmosphere of 50% humidity for 3 months or 12 months, or annealed in an oven of 60° C. for 24 hours, after which time the surface of the flat plate molded article was visually observed. The case where a white powdery substance did not come out on the surface was defined as ○ and the case where a white powdery substance came out on the surface was defined as Examples 2 to 4

Pellets of an aliphatic polyester resin composition were prepared in the same manner as in Example 1 at the blending ratio shown in Table 1. Then, the miscibility was confirmed. The release time during injection molding as well as the blooming of the flat plate molded article were also evaluated. The results are shown in Table 1.

Comparative Examples 1 to 4

Pellets of an aliphatic polyester resin composition were prepared in the same manner as in Example 1 at the blending ratio shown in Table 1. Then, the miscibility was confirmed. The release time during injection molding as well as the blooming of the flat plate molded article were also evaluated. The results were shown in Table 1.

TABLE 1

| | | | Examples | | | | Comparative Examples | | | |
|---|---|---|---|---|---|---|---|---|---|---|
| | | | 1 | 2 | 3 | 4 | 1 | 2 | 3 | 4 |
| Raw materials | Polyhydroxyalkanoate | A1 | 100 | 100 | 100 | 100 | 100 | 100 | 100 | 100 |
| | Vinyl acetate-containing copolymer | B1 | 5 | | | | | 3 | | |
| | Vinyl acetate-containing copolymer | B2 | | 3 | | | | | | |
| | Vinyl acetate-containing copolymer | B3 | | | | | | | | 5 |
| | Vinyl acetate-containing copolymer | B4 | | | 2 | | | | | |
| | Vinyl acetate-containing copolymer | B5 | | | | 1 | | | | |
| | Pentaerythritol | — | 1 | 1 | 1 | 1 | 0 | 0 | 1 | 1 |
| Resin composition | Miscibility | — | Immiscible | Immiscible | Immiscible | Immiscible | — | Immiscible | — | Miscible |
| Injection molding | Release time | Seconds | 20 | 20 | 20 | 20 | >60 | >60 | 20 | 20 |

TABLE 1-continued

|  |  | Examples | | | | Comparative Examples | | | |
| --- | --- | --- | --- | --- | --- | --- | --- | --- | --- |
|  |  | 1 | 2 | 3 | 4 | 1 | 2 | 3 | 4 |
| Evaluation of blooming | 23° C., 50% RH after 3 months | — | ○ | ○ | ○ | ○ | ○ | ○ | x | x |
|  | 23° C., 50% RH after 12 months | — | ○ | ○ | ○ | ○ | ○ | ○ | x | x |
|  | 60° C., 24 hours, after annealing | — | ○ | ○ | ○ | ○ | ○ | ○ | x | x |

As shown in Table 1, in Comparative Examples 1 and 2, the molded article required the release time of 60 seconds or more for lack of the pentaerythritol. Further, in Comparative Example 3, the release time of the molded article was 20 seconds which were good, but the blooming occurred for lack of the vinyl acetate-containing copolymer. In Comparative Example 4, the release time of the molded article was 20 seconds which were good, but the blooming occurred because the vinyl acetate-containing copolymer was miscible with the PHA.

On the other hand, in Examples 1 to 4, the vinyl acetate-containing copolymer and the pentaerythritol were used in combination. As a result, the release time measured during injection molding was 20 seconds which were good. Further, the blooming did not occur even after the molded article was stored at 23° C. under atmosphere of 50% RH for 3 months or for 12 months, or even after the molded article was annealed in an oven of 60° C. for 24 hours.

By using the vinyl acetate-containing copolymer immiscible with the PHA in combination with the pentaerythritol, the release time became shorter and the blooming did not occur.

Examples 5 to 7 Comparative Examples 5 to 7

Pellets of an aliphatic polyester resin composition were prepared in the same manner as in Example 1 at the blending ratio shown in Table 2. Then, the miscibility was confirmed. The release time during injection molding as well as the blooming of the flat plate molded article were also evaluated. The results are shown in Table 2.

As shown in Table 2, in Comparative Examples 5 and 6, the release time was short, but the blooming occurred because the vinyl acetate-containing copolymer was in a state of being miscible with the PHA. Further, in Comparative Example 7, the release time was short, but the blooming occurred for lack of the vinyl acetate-containing copolymer. On the other hand, in Examples 5 to 7, the vinyl acetate-containing copolymer that is immiscible with the PHA was used in combination with the pentaerythritol. As a result, the release time became shorter and the blooming did not occur.

The invention claimed is:
1. An aliphatic polyester resin composition, comprising:
a polyhydroxyalkanoate selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), poly(3-hydroxybutyrate-co-4-hydroxybutyrate), and a combination thereof;
a vinyl acetate-containing copolymer; and
pentaerythritol,
wherein the polyhydroxyalkanoate and the vinyl acetate-containing copolymer are immiscible, and
the vinyl acetate-containing copolymer is included in an amount of from 0.5 to 5 parts by weight, and the pentaerythritol is included in an amount of from 0.05 to 20 parts by weight, with respect to 100 parts by weight of the polyhydroxyalkanoate.
2. The aliphatic polyester resin composition according to claim 1, comprising from 0.7 to 3 parts by weight of the vinyl acetate-containing copolymer and from 0.5 to 8 parts

TABLE 2

|  |  |  | Examples | | | Comparative Examples | | |
| --- | --- | --- | --- | --- | --- | --- | --- | --- |
|  |  |  | 5 | 6 | 7 | 5 | 6 | 7 |
| Raw materials | Polyhydroxyalkanoate | A2 | 100 |  |  | 100 |  |  |
|  | Polyhydroxyalkanoate | A3 |  | 100 |  |  | 100 |  |
|  | Polyhydroxyalkanoate | A4 |  |  | 100 |  |  | 100 |
|  | Vinyl acetate-containing copolymer | B3 |  |  |  | 2 | 2 |  |
|  | Vinyl acetate-containing copolymer | B5 | 2 | 2 | 2 |  |  |  |
|  | Pentaerythritol | — | 1.5 | 1 | 1.5 | 1.5 | 1 | 1.5 |
| Resin composition | Miscibility | — | Immiscible | Immiscible | Immiscible | Miscible | Miscible | — |
| Injection molding | Release time | Seconds | 25 | 20 | 25 | 25 | 20 | 25 |
| Evaluation of blooming | 23° C., 50% RH, after 3 months | — | ○ | ○ | ○ | x | x | x |
|  | 23° C., 50% RH, after 12 months | — | ○ | ○ | ○ | x | x | x |
|  | 60° C., 24 hours, after annealing | — | ○ | ○ | ○ | x | x | x | by weight of the pentaerythritol with respect to 100 parts by weight of the polyhydroxyalkanoate.

3. The aliphatic polyester resin composition according to claim 1, wherein the vinyl acetate-containing copolymer is an ethylene-vinyl acetate copolymer.

4. The aliphatic polyester resin composition according to claim 3, wherein the ethylene-vinyl acetate copolymer has a vinyl acetate content of from 30 to 60 wt %.

5. The aliphatic polyester resin composition according to claim 1, wherein the vinyl acetate-containing copolymer is an ethylene-vinyl acetate-carbon monoxide terpolymer.

6. The aliphatic polyester resin composition according to claim 5, wherein the ethylene-vinyl acetate-carbon monoxide terpolymer has a vinyl acetate content of from 20 to 40 wt % and a carbon monoxide content of from 5 to 20 wt %.

7. An aliphatic polyester resin molded article, produced by molding the aliphatic polyester resin composition according to claim 1.

8. The aliphatic polyester resin composition according to claim 2, wherein the vinyl acetate-containing copolymer is an ethylene-vinyl acetate copolymer having a vinyl acetate content of from 30 to 60 wt %, or an ethylene-vinyl acetate-carbon monoxide terpolymer having a vinyl acetate content of from 20 to 40 wt % and a carbon monoxide content of from 5 to 20 wt %.

9. The aliphatic polyester resin composition according to claim 2,
wherein the vinyl acetate-containing copolymer is an ethylene-vinyl acetate copolymer having a vinyl acetate content of from 33 to 50 wt %, or an ethylene-vinyl acetate-carbon monoxide terpolymer having a vinyl acetate content of from 24 to 28.5 wt % and a carbon monoxide content of from 9 to 10 wt %.

10. The aliphatic polyester resin composition according to claim 1, wherein the aliphatic polyester resin composition comprises from 0.7 to 5 parts by weight of the vinyl acetate-containing copolymer and from 0.1 to 10 parts by weight of the pentaerythritol with respect to 100 parts by weight of the polyhydroxyalkanoate.

11. The aliphatic polyester resin composition according to claim 1, wherein the poly(3-hydroxybutyrate-co-3-hydroxyvalerate), the poly(3-hydroxybutyrate-co-3-hydroxyvalerate-co-3-hydroxyhexanoate), the poly(3-hydroxybutyrate-co-3-hydroxyhexanoate), and the poly(3-hydroxybutyrate-co-4-hydroxybutyrate) comprise 80 mol % or more of 3-hydroxybutyrate.

12. The aliphatic polyester resin composition according to claim 1, wherein the polyhydroxyalkanoate has a weight-average molecular weight of from 200,000 to 2,500,000.

13. The aliphatic polyester resin composition according to claim 1, further comprising:
at least one additive selected from the group consisting of a lubricant, a crystal nucleating agent other than the pentaerythritol, a plasticizer, a hydrolysis inhibitor, an antioxidant, a releasing agent, an ultraviolet absorber, a coloring agent, an inorganic filler, an organic filler, an inorganic fiber, an organic fiber, and a natural fiber.

14. The aliphatic polyester resin composition according to claim 1, wherein the polyhydroxyalkanoate is at least one of poly(3-hydroxybutyrate-co-3-hydroxyhexanoate) comprising 80 mol % or more of 3-hydroxybutyrate and 20 mol % or less of 3-hydroxyhexanoate, and poly(3-hydroxybutyrate-co-4-hydroxybutyrate) comprising 80 mol % or more of 3-hydroxybutyrate and 20 mol % or less of 4-hydroxybutyrate.

15. The aliphatic polyester resin composition according to claim 2, wherein the poly(3-hydroxybutyrate-co-3-hydroxyvalerate), the poly(3-hydroxybutyrate-co-3-hydroxyvalerate-co-3-hydroxyhexanoate), the poly(3-hydroxybutyrate-co-3-hydroxyhexanoate), and the poly(3-hydroxybutyrate-co-4-hydroxybutyrate) comprise 80 mol % or more of 3-hydroxybutyrate.

16. The aliphatic polyester resin composition according to claim 1, wherein the vinyl acetate-containing copolymer is an ethylene-vinyl acetate copolymer having a vinyl acetate content of from 30 to 60 wt %, or an ethylene-vinyl acetate-carbon monoxide terpolymer having a vinyl acetate content of from 20 to 40 wt % and a carbon monoxide content of from 5 to 20 wt %.

17. The aliphatic polyester resin composition according to claim 14, wherein the vinyl acetate-containing copolymer is included in an amount of from 0.7 to 3 parts by weight, and the pentaerythritol is included in an amount of from 0.5 to 8 parts by weight, with respect to 100 parts by weight of the polyhydroxyalkanoate.

18. The aliphatic polyester resin composition according to claim 1, wherein the polyhydroxyalkanoate has a weight-average molecular weight of from 250,000 to 2,000,000.

19. The aliphatic polyester resin composition according to claim 1, wherein the polyhydroxyalkanoate has a weight-average molecular weight of from 300,000 to 1,000,000.

20. The aliphatic polyester resin composition according to claim 1, wherein the polyhydroxyalkanoate is poly(3-hydroxybutyrate-co-3-hydroxyhexanoate) or poly(3-hydroxybutyrate-co-4-hydroxybutyrate) comprising 86 to 94.4 mol % of 3-hydroxybutyrate.

* * * * *